United States Patent
Patel et al.

(10) Patent No.: US 7,631,009 B1
(45) Date of Patent: Dec. 8, 2009

(54) REDUNDANCY CHECK OF TRANSACTION RECORDS IN A FILE SYSTEM LOG OF A FILE SERVER

(75) Inventors: Dixit Patel, Piscataway, NJ (US); Morgan Clark, South Orange, NJ (US); Jean Pierre Bono, Westborough, MA (US)

(73) Assignee: EMC Corporation, Hopkinton, MA (US)

( * ) Notice: Subject to any disclaimer, the term of this patent is extended or adjusted under 35 U.S.C. 154(b) by 316 days.

(21) Appl. No.: 11/619,132

(22) Filed: Jan. 2, 2007

(51) Int. Cl.
*G06F 17/00* (2006.01)

(52) U.S. Cl. .................. 707/102; 707/100; 707/101; 707/104.1

(58) Field of Classification Search ......... 707/100–102, 707/104.1
See application file for complete search history.

(56) References Cited

U.S. PATENT DOCUMENTS

| | | | |
|---|---|---|---|
| 5,893,140 | A | 4/1999 | Vahalia et al. |
| 6,324,581 | B1 | 11/2001 | Xu et al. |
| 6,389,420 | B1 | 5/2002 | Vahalia et al. |
| 2004/0059822 | A1 | 3/2004 | Jiang et al. |
| 2005/0223302 | A1* | 10/2005 | Bono ........................ 714/55 |
| 2005/0240628 | A1 | 10/2005 | Jiang et al. |

OTHER PUBLICATIONS

Uresh Vahalia, Unix Internals: The New Frontiers, Chapter 9, "File System Implementations," and Chapter 11, Advanced File Systems, 1996, p. 261-289, 338-371, Prentice-Hall, Inc., Upper Saddle River, New Jersey.

"Celerra File Server Architecture for High Availability," Aug. 1999, 11 pages, EMC Corporation, Hopkinton, Mass.

"Celerra File Server in the E-Infostructure," 2000, 12 pages, EMC Corporation, Hopkinton, Mass.

"Enginuity: The Symmetrix Storage Operating Environment," EMC White Paper, Jul. 2005, 21 pages, EMC Corporation, Hopkinton, Mass.

"EMC CLARiiON Enterprise Storage Systems," Product Description Guide, Apr. 2002, 29 pages, EMC Corporation, Hopkinton, Mass.

Nana Langstedt, Linux Directory Structure, Sep. 22, 2005, 3 pages, tuxfiles.org.

(Continued)

*Primary Examiner*—Sana Al-Hashemi
(74) *Attorney, Agent, or Firm*—Richard Auchterlonie; Novak Druce & Quigg, LLP

(57) ABSTRACT

To recover from partial writes of metadata transactions to a file system log, a redundancy check is added to each log record. Upon re-boot of the file server, the file system is recovered by finding the last valid record in the log, and then replaying records from the log into the on-disk file system. The replay is terminated prior to the last valid record upon reaching any record with a bad redundancy check. A "fsck" is performed on the file system prior to granting client access to the file system only if the log recovery was terminated prior to the last valid record upon reaching a record with a bad redundancy check and the position of the records in the log indicates that this record with a bad redundancy check could not have been written to the log concurrently with the last valid record.

20 Claims, 6 Drawing Sheets

OTHER PUBLICATIONS

Nana Langstedt, How to edit and understand /etc/fstab—1.1, Jan. 19, 2006, 4 pages, tuxfiles.org.

Nana Langstedt, How to mount filesystems in Linux—1.1 Oct. 8, 2005, 4 pages, tuxfiles.org.

mount(8)—Linux man page, printed Jun. 30, 2006, 18 pages, die.net.

fsck(8)—Linux man page, printed Jun. 30, 2006, 3 pages, die.net.

Boot Fedora Linux Faster: How I Modified Fedora to Boot in Under 25 Seconds, Jul. 15, 2005, inprovedsource.com.

Jayant Mathew, Intel Looks to Reduce PC Boot Time, Electronic News, Sep. 4, 2000, 1 page, Cahners Publishing Co., Reed Elsevier Group, New York, NY.

Reduce Boot Time, PC Magazine, Nov. 2002, 1 page, Ziff Davis Media Inc., New York, NY.

Justin Whitney & Dan Ragland, Building a Fast Boot System—with Intel(R) Rapid Bios Boot, Intel(R) Developer UPDATE Magazine, Oct. 2000, 6 pages, Intel Corp., Santa Clara, CA.

P. Deutsch, "GZIP file format specification version 4.3," Network Working Group, Request for Comments: 1952, May 1996, 12 pages, The Internet Society, Reston, VA.

Andrew Tridgell, Unix SMB/CIFS crc32 implementation, 2003, posted at "samba.org".

"Cyclic Redundancy Check," Wikipedia, Nov. 2006, 9 pages, Wikimedia Foundation, Inc., San Francisco, CA.

Uresh Vahalia, Cary C. Gray, Dennis Ting, Metadata Logging in an NFS Server, USENIX 1995, Jan. 16-20, 1995, New Orleans, Louisiana, 12 pages, the USENIX Association, Berkeley, CA.

* cited by examiner

REDUNDANCY CHECK OF TRANSACTION RECORDS IN A FILE SYSTEM LOG OF A FILE SERVER

FIELD OF THE INVENTION

The present invention relates to file servers, and in particular a computer program of a file server for performing recovery of file system metadata from a file system log when a data processor of the file server is reset.

BACKGROUND OF THE INVENTION

A conventional file server has a number of disk drives for storing files of one or more file systems, and at least one data processor coupled to the disk drives for access to the file systems. The data processor executes various computer programs. Occasionally it becomes necessary to restart execution of the data processor by resetting the data processor. For example, the data processor is reset after its normal sequence of program execution has become disrupted by a power surge, program memory failure, or software bug. If the data processor itself has failed, then it is replaced with another data processor. In either case it is possible that one or more of the file systems have become inconsistent due to interruption of metadata transactions upon the file systems.

For example, a file server storing files in a Unix-based file system (UxFS) typically writes file system metadata changes to an "intent log" before the metadata changes are made to the file system. The metadata changes are grouped into respective transactions. Each transaction consists of metadata changes from one consistent state of the file system metadata to a next consistent state of the file system metadata. Each transaction is written into a respective record of the intent log. Each record of the intent log includes a header containing a transaction identifier (ID) and the record size, and the header is followed by the metadata changes of the transaction. The transaction ID is incremented as the records are written in sequence to the intent log, so that a first record and a last record in the log can be identified by inspecting the transaction IDs of the records in the log. Upon re-boot of the file server, the metadata changes in the intent log are replayed into the file system in order to recover a consistent state of the file system. For replay, the transaction IDs and record sizes in the records of the intent log are inspected to determine the first record in the log and the last record in the log, and to invalidate the record if the size of the record is not equal to the spacing between the transaction ID of the record and the transaction ID of the following record in the log. The intent log is replayed by sequentially reading the transactions from the intent log and writing them into the file system starting with the first record in the log and ending with the last record in the log or ending earlier when a record to be read from the log is invalidated by checking the size of the record.

It is possible for a file system log to become corrupted by circumstances such as a power surge that would disrupt normal processing and require re-boot of the file server. If the file system log is corrupted, it might not be possible to restore the file system to a consistent state that existed during normal processing. For some application programs, when the file system log does not restore the file system to a consistent state, the file system can be recovered by re-running the application program upon a backup copy of the file system. If a backup copy of the file system does not exist or if the application cannot be re-run, then often an attempt is made to repair the inconsistent file system by executing a utility program such as the Unix or Linux "fsck" utility.

SUMMARY OF THE INVENTION

It is desired to enhance file system integrity upon recovery after a server crash without a significant increase in the service recovery time. A study of log inconsistencies after the conventional recovery process revealed that a likely cause of such inconsistencies was a partial write to the log at the time of the server crash. Inconsistencies were also possible due to damage elsewhere in the log (e.g., through hardware failure or configuration error) but there were insufficient checks to discover such corruption. From this study, it was concluded that significant errors that should be corrected during log recovery were a failed write occurring as the very last write to the log and any other partial transactions that might have been written with this very last write to the log.

In accordance with one aspect, the invention provides a method of booting a file server. The file server has data storage containing a file system and a log of metadata transactions upon the file system, and at least one data processor coupled to the data storage for accessing the file system and the log. The method includes, in response to a reset of the at least one data processor, replaying the metadata transactions from the log upon the file system for recovering a consistent state of the file system. The log includes a series of records of the metadata transactions upon the file system. Each of the records includes a redundancy check for determining validity of the record. The replaying of the metadata transactions from the log includes using the redundancy checks for sequentially writing metadata transactions from records determined as valid into the file system and terminating the sequential writing of the metadata transactions from the records into the file system upon writing a metadata transaction of a record immediately preceding a record determined as invalid.

In accordance with another aspect, the invention provides a method of booting a file server. The file server has data storage containing a file system and a log of metadata transactions upon the file system, and at least one data processor coupled to the data storage for accessing the file system and the log. The log includes a series of records of the metadata transactions upon the file system, and each of the records includes a redundancy check for determining validity of the record. The method includes, in response to a reset of the at least one data processor, searching the log and using the redundancy checks to find a last valid record in the log, and replaying the metadata transactions from the log upon the file system for recovering a consistent state of the file system. The replaying of the metadata transactions from the log includes using the redundancy checks for sequentially writing metadata transactions from records determined as valid into the file system and terminating the sequential writing of the metadata transactions from the records into the file system upon writing a metadata transaction of a record immediately preceding a record determined as invalid, the record determined as invalid preceding the last valid record in the log. The method further includes determining from information from the log that the record determined as invalid and the last valid record in the log were not written concurrently to the log, and in response to determining from information from the log that the record determined as invalid and the last valid record in the log were not written concurrently to the log, checking the file system for consistency.

In accordance with yet another aspect, the invention provides a file server. The file server includes data storage for containing a file system and a log of metadata transactions upon the file system, and at least one data processor coupled to the data storage for accessing the file system and the log. The at least one data processor is programmed for responding to a reset of the at least one data processor by replaying the metadata transactions from the log upon the file system for recovering a consistent state of the file system. The log includes a series of records of the metadata transactions upon the file system, and each of the records includes a redundancy check for determining validity of the record. The at least one data processor is programmed for replaying the metadata transactions from the log by using the redundancy checks for sequentially writing metadata transactions from records determined as valid into the file system and terminating the sequential writing of the metadata transactions from the records into the file system upon writing a metadata transaction of a record immediately preceding a record determined as invalid.

BRIEF DESCRIPTION OF THE DRAWINGS

Additional features and advantages of the invention will be described below with reference to the drawings, in which.

Figure 1:
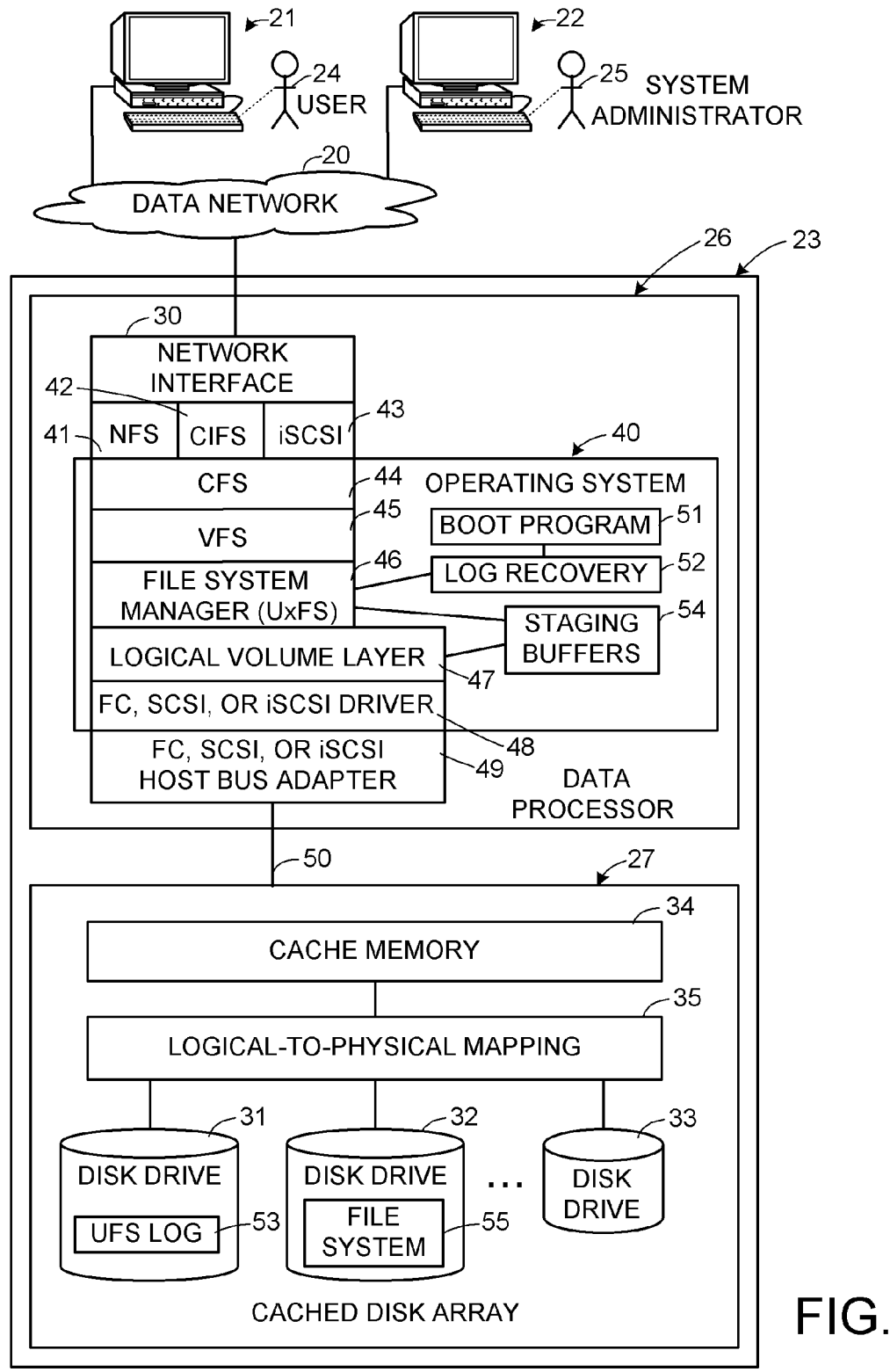
FIG. 1 is block diagram of a data network including a file server having a new log recovery program in accordance with an aspect of the present invention.

While the invention is susceptible to various modifications and alternative forms, a specific embodiment thereof has been shown in the drawings and will be described in detail. It should be understood, however, that it is not intended to limit the invention to the particular form shown, but on the contrary, the intention is to cover all modifications, equivalents, and alternatives falling within the scope of the invention as defined by the appended claims.

DETAILED DESCRIPTION OF THE PREFERRED EMBODIMENT

With reference to FIG. 1, there is shown a data processing system incorporating the present invention. The data processing system includes a data network 20 interconnecting clients 21, 22 and servers such as a network file server 23. The data network 20 may include any one or more of network connection technologies, such as Ethernet, and communication protocols, such as TCP/IP. The clients 21, 22, for example, are workstations such as personal computers using either UNIX or Microsoft Windows operating systems. The workstations are operated by human users 24, 25. The user 25 is a system administrator having sufficient privileges for configuring the network file server 23 and for receiving status and error messages from the network file server.

Various aspects of the network file server 23 are further described in Vahalia et al., U.S. Pat. No. 5,893,140 issued Apr. 6, 1999, incorporated herein by reference, Xu et al., U.S. Pat. No. 6,324,581, issued Nov. 27, 2002, incorporated herein by reference, Vahalia et al., U.S. Pat. No. 6,389,420, incorporated herein by reference, Jiang et al., U.S. Patent Application Publication 2005/0240628, published Oct. 27, 2005, incorporated herein by reference, and Jiang et al., U.S. Patent Application Publication 2004/0059822-A1 published Mar. 25, 2004, incorporated herein by reference.

The network file server 23 includes at least one data processor 26 and a cached disk array 27. The network file server 23 is managed as a dedicated network appliance, integrated with popular network file systems in a way, which, other than its superior performance, is transparent to the end user. The data processor 26, for example, is a high-end commodity computer. The cached disk array 27 includes multiple disk drives 31, 32, 33, a high-speed random-access cache memory 34, and logical-to-physical mapping 35 between the cache memory 34 and the disk drives.

The data processor 26 has a network interface 30 for communication of data packets over the data network 20 via a data transmission protocol such as TCP/IP. The data processor 26 is programmed with a Network File System (NFS) module 41 for supporting communication with network clients over the data network 20 using the NFS file access protocol, a Common Internet File System (CIFS) module 42 for supporting communication with network clients over the data network using the CIFS file access protocol, and an iSCSI module 43 for providing network block services in accordance with the Internet SCSI protocol. The NFS module 41, the CIFS module 42, and the iSCSI module 43 are layered over a Common File System (CFS) module 44, and the CFS module is layered over a Virtual File System (VFS) module 45. The VFS module 45 is layered over a Universal File System (UxFS) module 46. The UxFS module 46 is a file system manager for managing a UNIX-based file system 55 in storage 32 of the file server. The CFS module 44 provides higher-level functions common to NFS and CIFS.

The UxFS module 46 accesses data organized into logical volumes defined by a logical volume layer module 47. Each logical volume maps to contiguous logical storage addresses in the cached disk array 27. The logical volume layer module 47 is layered over a Fibre-Channel (FC), Small Computer System Interface (SCSI), or an Internet SCSI (iSCSI) driver 48. The data processor 26 sends storage access requests through a host bus adapter 49 using the FC, SCSI, or iSCSI protocol, depending on the physical data link 50 between the data processor 26 and the cached disk array 27.

As shown in FIG. 1, the CFS module 44, the VFS module 45, the UxFS module 46, the logical volume layer 47, and the Fibre Channel, SCSI, or iSCSI driver 48 are modules of an operating system program 40. The NFS module 41, CIFS module 42, and iSCSI module 43 are internal application programs supported by the operating system 40. The operating system 40, for example, is a version of the LINUX open-source operating system.

In the file server 23, there is a good possibility that the file system 55 may be inconsistent after a re-boot due to a crash or reset of the data processor 26. For recovery of a consistent file system state upon re-boot, the UxFS file system manager 46 writes metadata transactions to a UFS intent log 53 before the metadata transactions are written to the on-disk file system 55. Each transaction consists of metadata changes from one consistent state of the file system metadata to a next consistent state of the file system metadata. Each transaction is written into a respective record of the UFS log. Each record of the UFS log includes a header containing a record number and the record size, and the header is followed by the metadata changes of the transaction. The record number is incremented as the records are written in sequence to the intent log, so that a first record and a last record in the log can be identified by inspecting the record numbers of the records in the log.

The operating system 40 includes a boot program 51 that is executed when the data processor 23 is reset. For example, the data processor 26 is responsive to a hardware reset input line triggered by a watchdog timer circuit or a reset push-button switch on a front panel of the data processor. When the hardware reset input line is triggered, an instruction counter of the data processor is loaded with a reset vector address pre-programmed in firmware. The reset vector address is the starting address of the boot program. The data processor 26 can also be reset in response to a user-initiated command or in response to a software bug. For example, a software bug may cause an attempt to execute an illegal instruction or to access protected memory, and the processor is reset in response to the illegal instruction or memory access fault.

The boot program 51 includes initialization of the operating system 40, and then the operating system sequentially executes each command in a "Boot.Config" file. The commands in the "Boot.Config" file include commands for configuring an interface to the cached disk array, commands for configuring storage volumes, commands for mounting file systems, and commands for configuring client interfaces.

When the boot program 51 requests the file system 55 to be mounted, the mount process checks the state of the UFS log for any transactions in the log that have not been written to the on-disk file system. The presence of the any such outstanding transaction is an indication of an interruption of normal execution of the operating system 55 because any outstanding metadata transaction should have been written to the on-disk file system during a normal shut-down.

When the mounting process determines that there are outstanding metadata transactions in the UFS log, the mounting process calls a log recovery program 52 for replaying the outstanding transactions to put the on-disk file system into a consistent state. The log recovery program 52 replays the outstanding transactions by sequentially reading the outstanding transaction records from the UFS log and writing the transactions into the on-disk file system. Once the outstanding transactions are written into the on-disk file system, they are marked as completed or removed from the UFS log.

The present invention more particularly concerns a new log recovery program for enhancing file system integrity upon recovery after a server crash without a significant increase in the service recovery time. A study of log inconsistencies after the conventional log recovery process revealed that a likely cause of such inconsistencies was a partial write to the log at the time of the server crash. Inconsistencies were also possible due to damage elsewhere in the log(e.g., through hardware failure or configuration error) but there were insufficient checks to discover such corruption. From this study, it was concluded that significant errors that could be and should be corrected were a failed write occurring as the very last write to the log and any other partial transactions that might have been written with this very last write to the log.

It may be possible for a partial write to occur if the record is larger than a certain minimum size for a guarantee of I/O atomicity during a re-boot. A partial write could also occur due to an abnormal condition, such as a power surge, that may have caused the file server to crash. Such a partial write may occur together with the very last write to the log when the partial write and the very last write to the log are done concurrently and the disruption of the file server occurs when both the partial write and the very last write to the log are in progress. The file server 23 in FIG. 1, for example, has a set of staging buffers 54 for writing the metadata transactions from the file system manager 46 to the UFS log 53. Because the UxFS metadata transactions are variable in length, it is most efficient to use a staging buffer size of at least the largest transaction size so that many of the smaller transactions are often loaded into a single staging buffer and written concurrently from the single staging buffer to the UFS log.

In order to more precisely determine the last validly-written record in the intent log upon a re-boot and to protect against corruption elsewhere in the intent log, a redundancy check (RC) is computed for every log record and the RC is inserted into the record header before issuing the I/O of the log records to the intent log. Various kinds of RCs could be used, such as a hash function, checksum, or cyclic redundancy check, for verification that a log record read from the log has not been corrupted since the record was created. For example, when the transaction record has been loaded into the transaction buffer, an RC is computed on the content of the transaction record (including the header), and then the RC is put into the transaction header. When the intent log is replayed during recovery after re-boot, the RC of the content of the transaction read from the log is recomputed and compared to the RC in the header for the transaction, in order to verify whether or not the transaction is corrupt. This RC verification is used first to determine the last valid record in the log. Then the process of replaying the transactions from the log into the file system is begun, and the RC verification is used to terminate the replay upon reaching any corrupt record before the last valid record so that any corrupt record in the log is not replayed into the file system.

The RC verification is also used to determine whether a record in the log is corrupt other than a record from a last write I/O to the log. If a corrupt record is found that could not have been written concurrently with the last valid record in the log, then this corruption is not due simply to re-boot of the file server. In this situation, the Unix or Linux "fsck" utility is used to check the file system for consistency and to repair the file system if it is found to be inconsistent. Otherwise, the Unix or Linux "fsck" utility is not used to check the file system for consistency, because in this case the new log recovery process with RC verification of the log records ensures a sufficient degree of verification of the file system integrity, and running the "fsck" utility would cause a significant increase in service recovery time.

Figure 2:
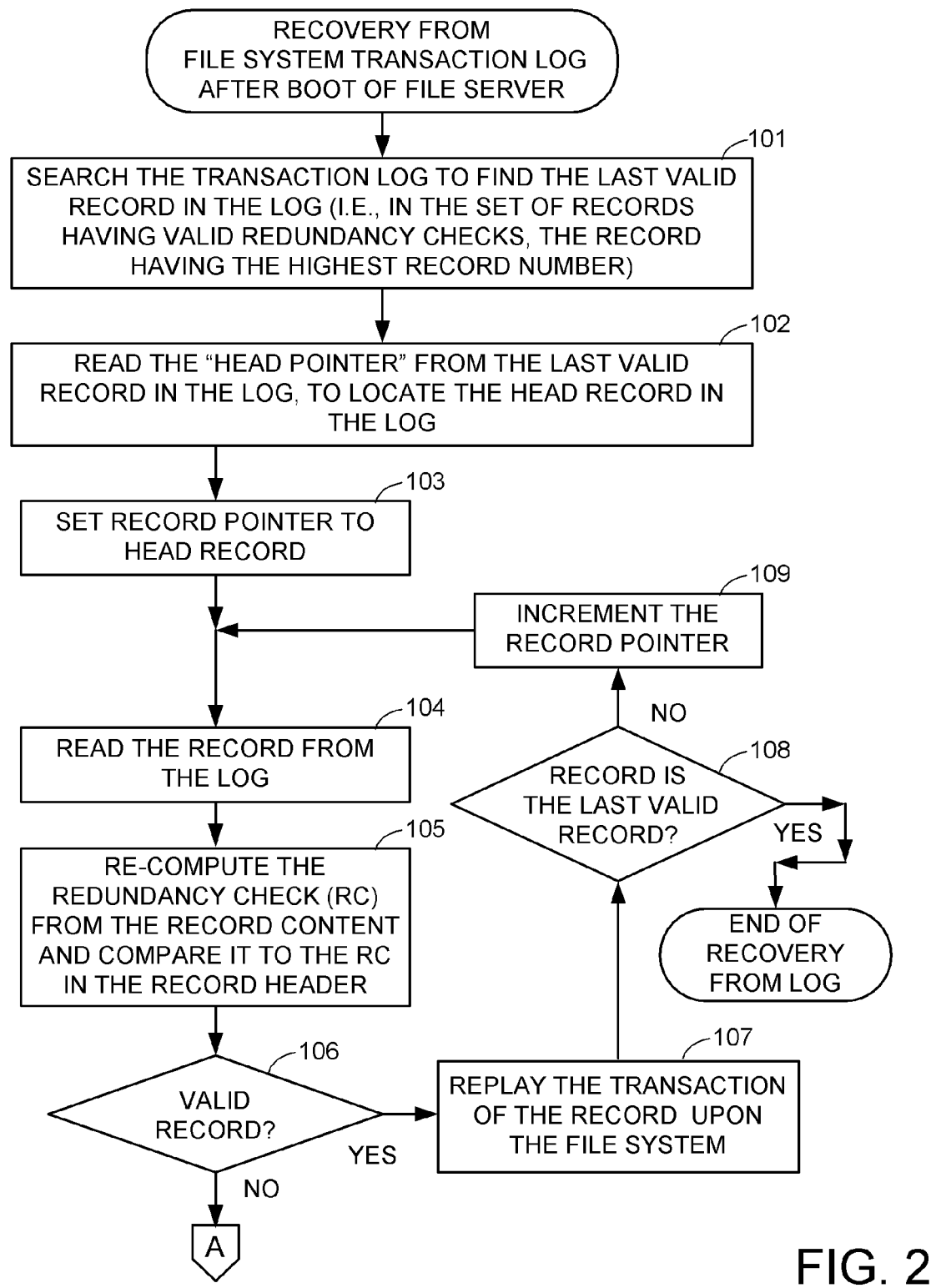
FIGS. 2 and 3 together comprise a high-level flowchart of the new log recovery program introduced in FIG. 1.
Figure 3:
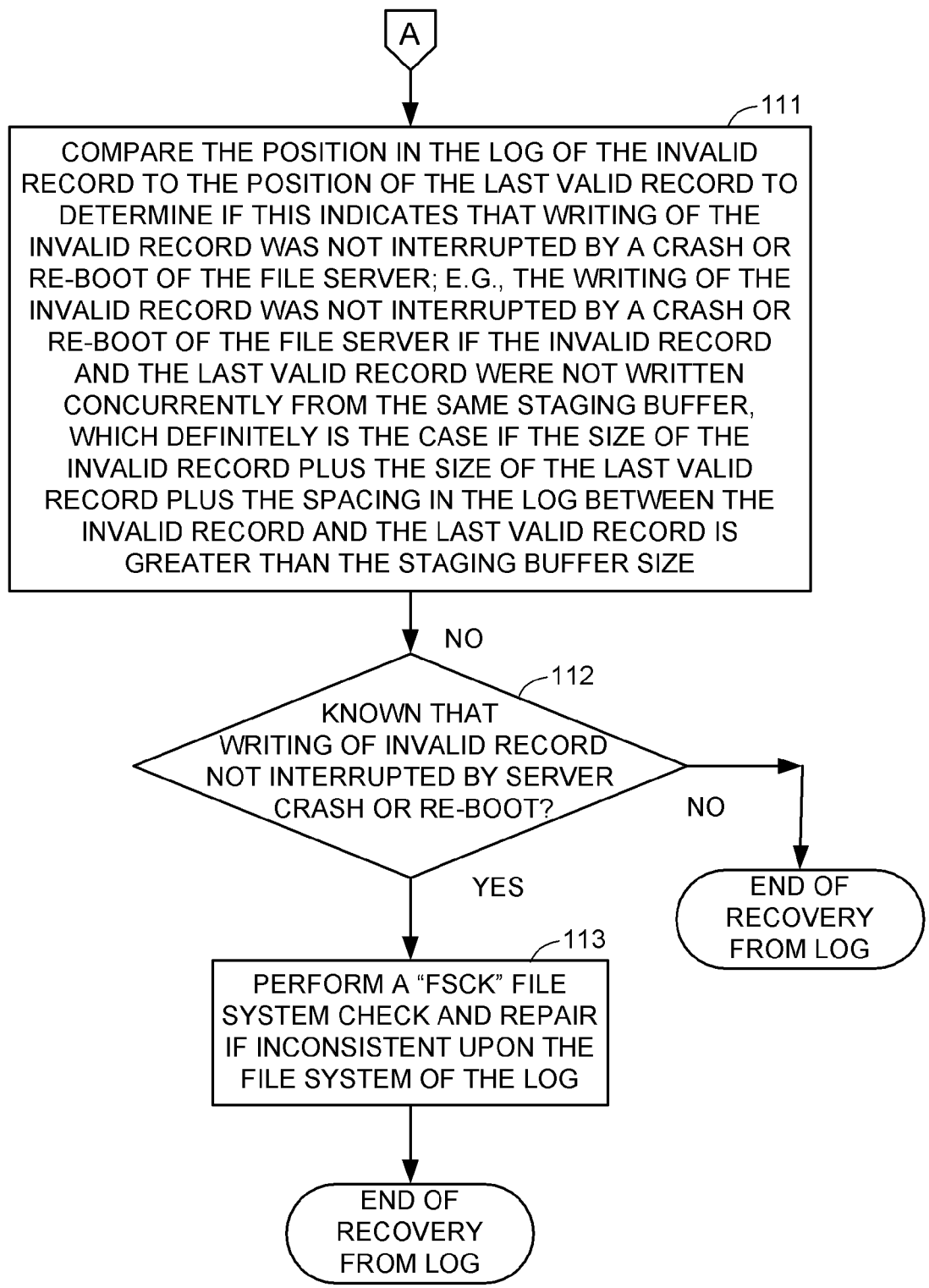

FIGS. 2 and 3 show the new log recovery process with RC verification of the log records. In a first step 101 of FIG. 2, the data processor searches the UFS transaction log to find the last valid record in the log. The last valid record in the log is the record having the highest record number from the set of records having valid RCs. Next, in step 102, the processor reads a head pointer from the last valid record in the log. The head pointer points to the record of the first outstanding transaction in the UFS log. Thus, in step 103, a record pointer is set to this head pointer in order to begin a process of sequentially replaying the outstanding transactions from the UFS log into the on-disk file system.

In step 104, the record (pointed-to by the record pointer) is read from the log. Then in step 105 the redundancy check is re-computed from the record content and compared to the record pointer in the header of the record in order to determine whether or not the record is valid. In step 106, if the redundancy check indicates that the record is valid, then execution branches to step 107 to replay the transaction of the record upon the file system. Then in step 108, if the record is the last valid record, then the log recovery process is finished. Otherwise, execution continues to step 109 to increment the record pointer to point to the next record in the log. Execution loops from step 109 back to step 104 to continue the replay process for the next outstanding transaction.

In step 106, if the redundancy check indicates that the record is not valid, execution continues to step 111 of FIG. 3. In step 111, the processor compares the position in the log of the invalid record to the position of the last valid record to determine if this indicates that writing of the invalid record to the log was not interrupted by a crash or re-boot of the file server. For example, the writing of the invalid record to the file server was not interrupted by a crash or re-boot of the file server if the invalid record and the last valid record were not written concurrently from the same staging buffer, which definitely is the case if the size of the invalid record plus the size of the last valid record plus the spacing in the log between the invalid record and the last valid record is greater than the size of the staging buffer. In step 112, if it is not known from the comparison in step 111 that the writing of the invalid record to the log was not interrupted by a crash or re-boot of the file server, then the log recovery process is finished. Otherwise, execution continues to step 113 to invoke the "fsck" utility to check the file system of the log for consistency and to repair the file system if it is found to be inconsistent. In this case, the invalid record could be due to noise or a software bug or some other reason not accounted for. After step 103, the log recovery process is finished.

FIGS. 4 to 8 show a specific implementation of the invention for a file server using an EMC Corporation CLARIION (Trademark) or SYMMETRIX (Trademark) cached disk array. For such a cached disk array, the minimum size for a guarantee of I/O atomicity upon re-boot is 8 K bytes for a non-striped log volume, and less than 8 K bytes for a striped log volume. The log records are written to the UFS log in a single I/O request of up to 256 K bytes in size, possibly including many individual records. Each record may range in size from 512 bytes (the size of a disk block) up to 16 K bytes, so that many log records may be contained in a single I/O request. At any point in time, a record is kept of metadata that is being changed by each transaction to the file system. The metadata changes for the transaction are collected in a transaction buffer, and at the end of the transaction the record of the transaction is added to a staging buffer. When the staging buffer is full of transaction records, it is added to the tail of a linked list of staging buffers. The content of the staging buffer at the head of the list is written in a single I/O to the log volume. If the single I/O has a size of greater than 8 K bytes, then the cached disk array might break the write block into smaller I/Os, and during a re-boot some of the smaller I/Os might succeed and others might not. If the intent log is a striped volume, for a single I/O of 8 K bytes, the write may succeed for some of the disks in the striped volume and fail for other disks in the striped volume.

Figure 4:
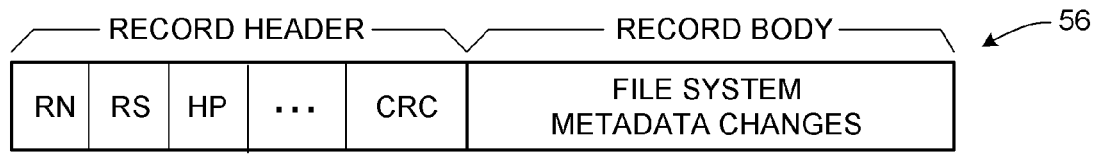
FIG. 4 is block diagram of a specific format for a metadata transaction record.

FIG. 4 shows a format for a transaction record 56 in the UFS log. The transaction record includes a record header and a record body. The record body contains the file system metadata changes of the transaction. The record header includes a record number (RN), a record size (RS), a head pointer (UP), and a number of additional fields. The last field of the header is a cyclic redundancy check (CRC). The CRC, for example, is a thirty-two bit CRC known as "CRC32" computed by calling an operating system utility routine. The "CRC32" is used for convenience since it provides a sufficiently high degree of verification, and utility routines for computing CRC32 are publicly available and in widespread use. A formal specification of CRC32 is given in ISO 3309 and ITU-T V.42, and computer code for computing CRC32 are published on the Internet in P. Deutsch, Network Working Group, Request for Comments: 1952, "GZIP file format specification version 4.3," May 1996; and in Andrew Tridgell, Unix SMB/CIFS crc32 implementation, 2003, posted at "samba.org".

In practice, the CRC field is initially set to zero, and then the CRC of the entire transaction record is computed and loaded into the transaction record. Then the record is written to the UFS log. When the record is later read from the UFS log, the CRC is removed and the CRC field is again set to zero, and the CRC is recomputed. This method of CRC calculation and comparison would permit an alternative kind of redundancy check to be substituted for the CRC32 simply by substituting a different utility routine for computing the redundancy check.

Figure 5:
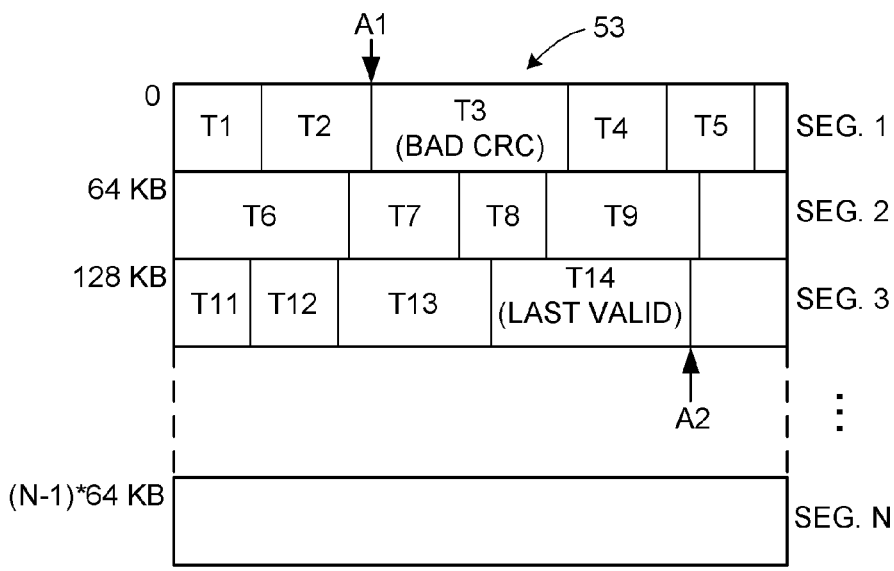
FIG. 5 is block diagram of a specific format for a file system log.

FIG. 5 shows a format for the UFS log 53. The log 53 is a series of 64 KB segments. A series of transactions T1 to T14 are shown in the UFS log. Within a staging buffer, the transactions are collected into segments of 64 KB so that no transaction crosses a segment boundary. Each transaction is rounded up to a multiple of 512 byte blocks because each 512 byte block should be atomically written to the disk storage.

Figure 6:
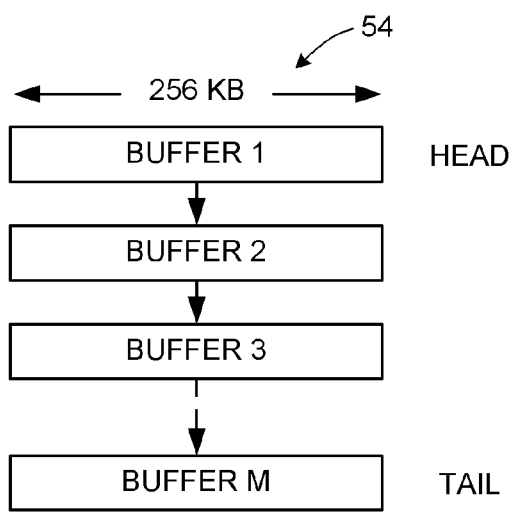
FIG. 6 is a block diagram of a specific format for a queue of staging buffers for writing metadata transactions to the file system log.

FIG. 6 shows that the staging buffers 54 are linked together in a queue. The staging buffer size is 256 KB. When a staging buffer is loaded and becomes full of transactions, it is added to the tail of the queue. The queue is serviced by writing the content of the staging buffer at the head of the queue to the UFS log, and then removing the staging buffer from the head of the queue, and then writing the content of the next staging buffer to the UFS log.

Figure 7:
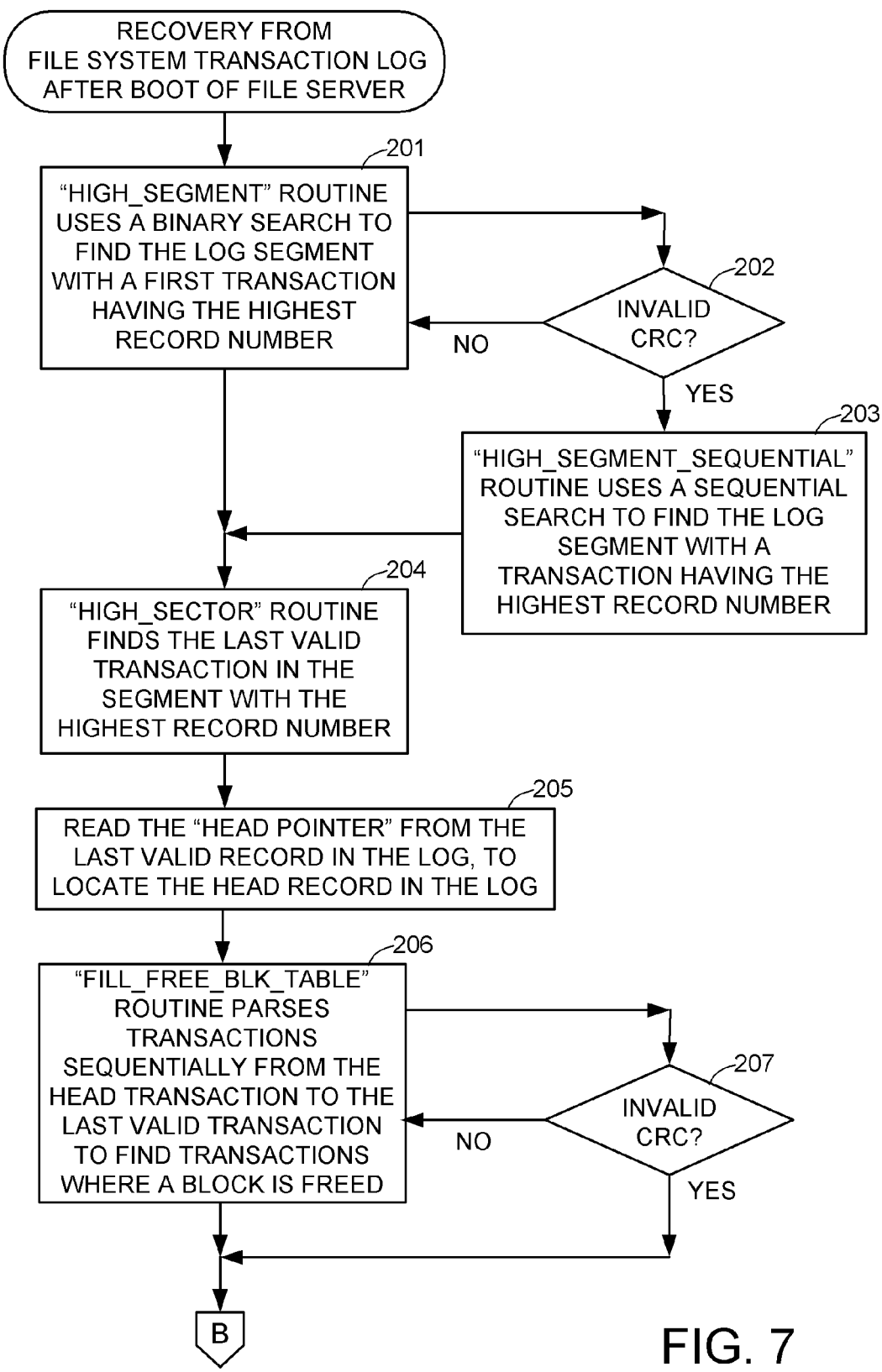
FIGS. 7 and 8 together comprise a flowchart of a specific implementation of the new log recovery program using the data structures of FIGS. 4, 5, and 6.
Figure 8:
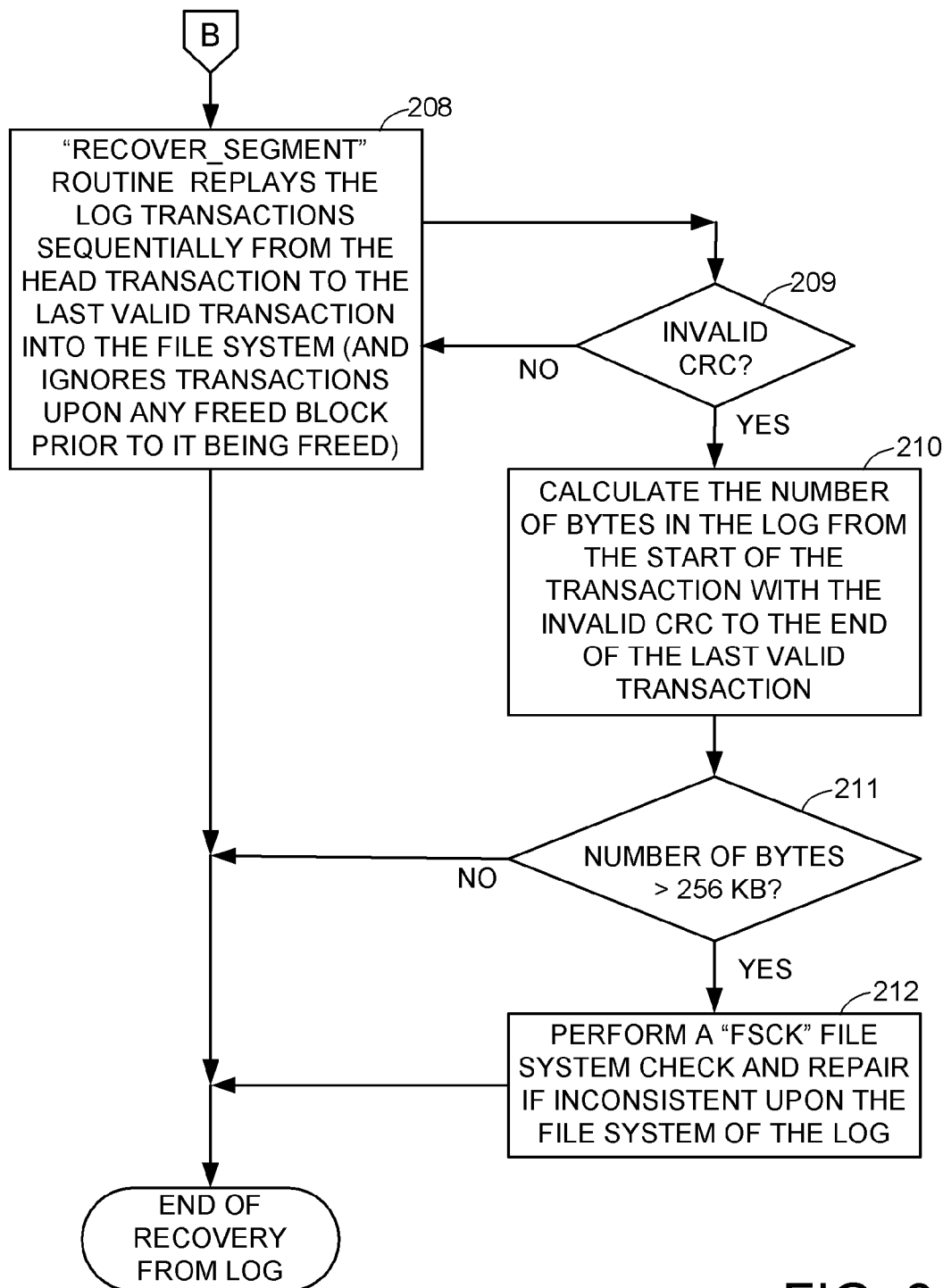

FIGS. 7 and 8 show a specific implementation of the new log recovery program using the data structures of FIGS. 4, 5, and 6. In a first step 201, a "High_Segment" routine is executed. The "High_Segment" routine uses a binary search to find the log segment with a first transaction having the highest record number. During this binary search, before inspecting the record number of the first transaction in a segment, the CRC of the transaction record is recomputed and compared to the CRC in the transaction record. If there is a miss-match indicating an invalid CRC, as tested in step 202, then the binary search is terminated, and execution continues to step 203. In step 203, a "High_Segment_Sequential" routine uses a sequential search to find the log segment with a transaction having the highest record number. After step 201 or 203, execution continues to step 204.

In step 204, a "High_Sector" routine is executed to find the last valid transaction in the segment with the highest record number. In step 205, the head pointer is read from the last valid record in the log, to locate the head record in the log. Then in step 206, a "Fill_Free_Blk_Table" routine parses transactions sequentially from the head transaction to the last valid transaction to find transactions where a block is freed. The record numbers of these transactions are written into a table so that later, when the transactions are replayed in step 208, any transactions upon a block prior to it being freed can be ignored. During this sequential parsing of the transactions, the CRC of each transaction record is recomputed and compared to the CRC in the transaction record. If there is a miss-match indicating an invalid CRC and thus an invalid transaction record, as tested in step 207, then the sequential parsing of the transactions in step 206 is terminated, and execution continues to step 208 of FIG. 8. Execution also continues from step 206 to step 208 for the case where no CRC miss-matches are found during the sequential parsing of the transactions.

In step 208 of FIG. 8, a "Recover Segment" routine is executed to replay the log transactions sequentially into the file system from the head transaction to the last valid transaction, but ignoring transactions upon any freed block prior to the block being freed. Step 208 accesses the free block table filled in step 206 in order to determine whether or not a transaction upon a block should be ignored. Before replaying each transaction, the CRC of the transaction record is recomputed and compared to the CRC in the transaction record. If there is a miss-match indicating an invalid CRC and thus an invalid transaction record, as tested in step 209, then the sequential replay of the transactions in step 208 is terminated, and execution continues to step 210.

In step 210, the data processor calculates the number of bytes in the log from the start of the transaction with the invalid CRC to the end of the last valid transaction. For example, for the log 53 in FIG. 5, this particular number of bytes is the difference (A2−A1) between the address A2 of the first byte following the last byte of the last valid transaction T14, and the byte address A1 of the first byte in the transaction T3 having the bad CRC.

In step 211, if the number of bytes is greater than 256 KB (i.e., the staging buffer size), then it is known that the writing of the record with the bad CRC was not interrupted by the crash or re-boot of the file server because the record with the bad CRC and the record of the last valid transaction were not written concurrently to the log. Therefore corruption of the record with the bad CRC is due to noise or a software bug or some other reason not accounted for. In this case execution continues to step 212 to invoke the "fsck" utility to check the file system for consistency and to repair the file system if it is found to be inconsistent before the file server gives clients access to the file system, and then the log recovery is finished. Otherwise, if the number of bytes calculated in step 210 is not greater than 256 KB, then execution branches from step 211 and the log recovery is finished without invoking the "fsck" utility to check or repair the file system before the file server gives clients access to the file system.

In view of the above, to recover from partial writes of metadata transactions to a file system log, a redundancy check is added to each log record. Upon re-boot of the file server, the file system is recovered by finding the last valid record in the log, and then replaying records from the log into the on-disk file system. The replay is terminated prior to the last valid record upon reaching any record with a bad redundancy check. A "fsck" is performed on the file system prior to granting client access to the file system only if the log recovery was terminated prior to the last valid record upon reaching a record with a bad redundancy check and the position of the records in the log indicates that this record with a bad redundancy check could not have been written to the log concurrently with the last valid record. In this fashion, the file system integrity is enhanced upon recovery after a server crash without a significant increase in the service recovery time.

When the log records are replayed up to and including the last valid record in the log, it is most certain that metadata changes subsequent to the last valid record were never written to the on-disk file system prior to the re-boot, so that the log recovery process will be successful in setting the on-disk file system to a consistent state. When the log records are replayed up to but not including a record with a bad redundancy check that may have been written concurrently with the last valid record, it is highly likely that the record with the bad redundancy check resulted from a partial write to the log due to the server crash or reboot during a concurrent write with the last valid record in the log, so that metadata changes of the record with a bad redundancy check or subsequent thereto were never written to the on-disk file system prior to the re-boot, so it is highly likely in this case that the log recovery process will set the on-disk file system to a consistent state if the log recovery process is terminated just prior to replay of the metadata changes of the record with the bad redundancy check. When the log records are replayed up to but not including a record with a bad redundancy check that most certainly was not written concurrently with the last valid record, it is possible that this corruption resulted from a recurring or ongoing disruption that may also have corrupted the writing of metadata to the on-disk file system, so in this case a "fsck" should be performed at the expense of a significant increase in service recovery time.

What is claimed is:

1. A method of booting a file server, the file server having data storage containing a file system and a log of metadata transactions upon the file system, and at least one data processor coupled to the data storage for accessing the file system and the log, said method comprising:
   in response to a reset of said at least one data processor, replaying the metadata transactions from the log upon the file system for recovering a consistent state of the file system,
   wherein the log includes a series of records of the metadata transactions upon the file system, each of the records includes a redundancy check for determining validity of said each of the records, the replaying of the metadata transactions from the log includes using the redundancy checks for sequentially writing metadata transactions from records determined as valid into the file system and terminating the sequential writing of the metadata transactions from the records into the file system upon writing a metadata transaction of a record immediately preceding a record determined as invalid.

2. The method as claimed in claim 1, which further includes determining that writing of the record determined as invalid had not been interrupted by a crash of the file server nor the reset of said at least one data processor, and in response to determining that writing of the record determined as invalid had not been interrupted by a crash of the file server nor the reset of said at least one data processor, checking the file system for consistency.

3. The method as claimed in claim 2, wherein the checking of the file system for consistency finds that the file system is inconsistent, and the method further includes, in response the finding that the file system is inconsistent, repairing the file system so that the file system becomes consistent.

4. The method as claimed in claim 2, wherein the determining that writing of the record determined as invalid had not been interrupted by a crash of the file server nor the reset of said at least one data processor includes comparing a position in the log of the record determined as invalid to a position in the log of a last valid record in the log.

5. The method as claimed in claim 2, wherein the determining that writing of the record determined as invalid had not been interrupted by a crash of the file server nor the reset of said at least one data processor includes finding a last valid record in the log, and determining that the record determined as invalid and the last valid record in the log were not written concurrently to the log.

6. The method as claimed in claim 5, wherein the determining that the record determined as invalid and the last valid record in the log were not written concurrently to the log includes determining that size of the record determined as invalid plus size of the last valid record in the log plus spacing in the log between the record determined as invalid and the last valid record exceeds size of a write operation to the log.

7. The method as claimed in claim 5, wherein the determining that the record determined as invalid and the last valid record in the log were not written concurrently to the log includes determining that that size of the record determined as invalid plus size of the last valid record in the log plus spacing in the log between the record determined as invalid and the last valid record exceeds size of a buffer used for writing records to the log.

8. The method as claimed in claim 1, which further includes, in response to the reset of said at least one data processor, determining that said record determined as invalid was not written to said log concurrently with writing a last valid record in said log, and then performing a consistency check upon the file system in response to determining that said record determined as invalid was not written to said log concurrently with writing the last valid record in said log.

9. A method of booting a file server, the file server having data storage containing a file system and a log of metadata transactions upon the file system, at least one data processor coupled to the data storage for accessing the file system and the log, wherein the log includes a series of records of the metadata transactions upon the file system, and each of the records includes a redundancy check for determining validity of said each of the records, said method comprising:

in response to a reset of said at least one data processor, searching the log and using the redundancy checks to find a last valid record in the log; and replaying the metadata transactions from the log upon the file system for recovering a consistent state of the file system, wherein the replaying of the metadata transactions from the log includes using the redundancy checks for sequentially writing metadata transactions from records determined as valid into the file system and terminating the sequential writing of the metadata transactions from the records into the file system upon writing a metadata transaction of a record immediately preceding a record determined as invalid, the record determined as invalid preceding the last valid record in the log; and determining from information from the log that the record determined as invalid and the last valid record in the log were not written concurrently to the log, and in response to determining from information from the log that the record determined as invalid and the last valid record in the log were not written concurrently to the log, checking the file system for consistency.

10. The method as claimed in claim 9, wherein the determining from information from the log that the record determined as invalid and the last valid record in the log were not written concurrently to the log includes determining that that size of the record determined as invalid plus size of the last valid record in the log plus spacing in the log between the record determined as invalid and the last valid record exceeds size of a write operation to the log.

11. The method as claimed in claim 9, wherein the determining from information from the log that the record determined as invalid and the last valid record in the log were not written concurrently to the log includes determining that that size of the record determined as invalid plus size of the last valid record in the log plus spacing in the log between the record determined as invalid and the last valid record exceeds size of a buffer used for writing records to the log.

12. A file server comprising data storage for containing a file system and a log of metadata transactions upon the file system, and at least one data processor coupled to the data storage for accessing the file system and the log, said at least one data processor being programmed for responding to a reset of said at least one data processor by replaying the metadata transactions from the log upon the file system for recovering a consistent state of the file system, wherein the log includes a series of records of the metadata transactions upon the file system, each of the records includes a redundancy check for determining validity of said each of the records, and wherein said at least one data processor is programmed for replaying the metadata transactions from the log by using the redundancy checks for sequentially writing metadata transactions from records determined as valid into the file system and terminating the sequential writing of the metadata transactions from the records into the file system upon writing a metadata transaction of a record immediately preceding a record determined as invalid.

13. The file server as claimed in claim 12, wherein said at least one data processor is programmed for determining that writing of the record determined as invalid had not been interrupted by a crash of the file server nor the reset of said at least one data processor, and in response to determining that writing of the record determined as invalid had not been interrupted by a crash of the file server nor the reset of said at least one data processor, checking the file system for consistency.

14. The file server as claimed in claim 13, wherein the checking of the file system for consistency finds that the file system is inconsistent, and said at least one data processor is further programmed for repairing the file system in response the finding that the file system is inconsistent, so that the file system becomes consistent.

15. The file server as claimed in claim 13, wherein said at least one data processor is programmed for determining that writing of the record determined as invalid had not been interrupted by a crash of the file server nor the reset of said at least one data processor by comparing a position in the log of the record determined as invalid to a position in the log of a last valid record in the log.

16. The file server as claimed in claim 13, wherein said at least one data processor is programmed for determining that writing of the record determined as invalid had not been interrupted by a crash of the file server nor the reset of said at least one data processor by finding a last valid record in the log, and determining that the record determined as invalid and the last valid record in the log were not written concurrently to the log.

17. The file server as claimed in claim 16, wherein said at least one data processor is programmed for determining that the record determined as invalid and the last valid record in the log were not written concurrently to the log by determining that size of the record determined as invalid plus size of the last valid record in the log plus spacing in the log between the record determined as invalid and the last valid record exceeds size of a write operation to the log.

18. The file server as claimed in claim 16, wherein said at least one data processor is programmed for determining that the record determined as invalid and the last valid record in the log were not written concurrently to the log by determining that size of the record determined as invalid plus size of the last valid record in the log plus spacing in the log between the record determined as invalid and the last valid record exceeds size of a buffer used for writing records to the log.

19. The file server as claimed in claim 12, wherein said at least one data processor is further programmed for responding to the reset of said at least one data processor by determining that said record determined as invalid was not written to said log concurrently with writing a last valid record in said log, and then performing a consistency check upon the file system in response to determining that said record determined as invalid was not written to said log concurrently with writing the last valid record in said log.

20. The file server as claimed in claim 12, wherein said at least one data processor is further programmed for responding to the reset of said at least one data processor by checking whether said record determined as invalid was not written to said log concurrently with writing a last valid record in said log, and once the checking determines that said record determined as invalid was not written to said log concurrently with writing a last valid record in the log, then performing a consistency check upon the file system before permitting a client of the file server to access the file system, and once the checking does not determine that said record determined as invalid was written to said log concurrently with writing a last valid record in said log, then not performing a consistency check upon the file system before permitting a client of the file server to access the file system.

* * * * *